United States Patent

[11] 3,568,040

| [72] | Inventor | Van P. Combs |
| | | Penfield, N.Y. |
| [21] | Appl. No. | 800,383 |
| [22] | Filed | Feb. 19, 1969 |
| [45] | Patented | Mar. 2, 1971 |
| [73] | Assignee | Mega Power Corporation |
| | | Rochester, N.Y. |

[54] MAGNETOMOTIVE ELECTRIC CURRENT GENERATOR UTILIZING VIBRATING MAGNETIZABLE METAL STRIPS
9 Claims, 5 Drawing Figs.

[52] U.S. Cl. ........................................... 322/3,
310/25
[51] Int. Cl. ........................................ H02k 35/00
[50] Field of Search ........................... 310/25, 36,
15; 322/3

[56] References Cited
UNITED STATES PATENTS

| 2,356,229 | 8/1944 | Dunlap et al. | 310/25X |
| 2,376,131 | 5/1945 | Dunlap et al. | 310/25 |
| 2,895,063 | 7/1959 | Morris | 310/15 |
| 2,926,313 | 2/1960 | Wiegand | 310/15X |

Primary Examiner—Oris L. Rader
Assistant Examiner—H. Huberfeld
Attorney—B. Edward Shlesinger ABSTRACT: The generator comprises a stationary core housed in a hollow, generally cylindrical, permanent magnet. A plurality of elongate, axially extending, angularly spaced, magnetizable metal shims are secured in radially spaced, concentric circular rows in the core, and project slightly axially beyond opposite ends, respectively, of the core to confront opposite poles, respectively, of the permanent magnet. A helical wire coil of conductive material is wound around each row of shims; and successive windings of the coil are separated from one another by thin sheets of conductive foil and dielectric material. A direct current motor is mounted at one end of the core. Its armature carries a head containing a plurality of like-oriented permanent magnets. When the head rotates, its magnets distort the lines of flux extending between the adjacent ends of the shims and the surrounding magnet, causing the shims to vibrate and induce a voltage in the coil. The coil and alternating layers of metal foil and dielectric material define condensers that are charged by the voltage induced in the coil. This charge, and the induced voltages, produce the power output of the generator.

INVENTOR.
VAN P. COMBS

INVENTOR.
VAN P. COMBS
BY
ATTORNEY

MAGNETOMOTIVE ELECTRIC CURRENT GENERATOR UTILIZING VIBRATING MAGNETIZABLE METAL STRIPS

This invention relates to electrical generators, and more particularly to a generator of the type that utilizes a permanent magnet to provide the energy necessary for the production of electric current.

The principal object of this invention is to provide a novel electric generator, which is substantially more compact and efficient than prior such generators.

A more specific object of this invention is to provide a novel generator which combines the use of permanent magnets and vibratory ferritic shims for producing electrical current. Other objects of the invention will be apparent hereinafter from the specification and from the red recital of the appended claims, particularly when read in conjunction with the accompanying drawings.

In the drawings

Figure 1:
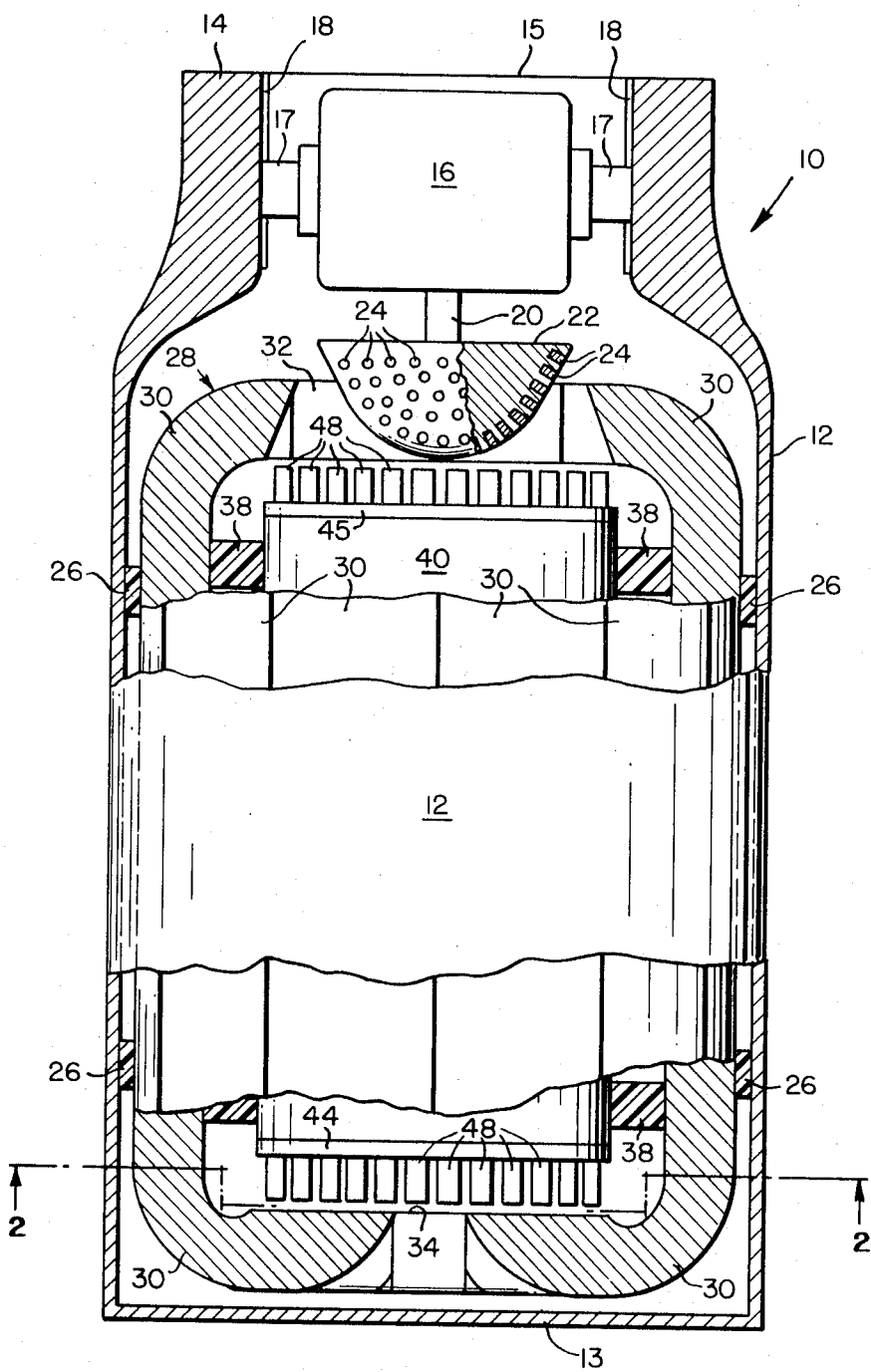
FIG. 1 is a plan view of a generator made in accordance with one embodiment of this invention, portions of the generator being broken away and shown in section.

Referring now to the drawings by numerals of reference, 10 (FIGS. 1 and 2) denotes a generator comprising a generally cylindrical housing 12 having a closed end 13, and a reduced-diameter neck 14 terminating in an open end 15. Housing 12, which is made from a nonmagnetic material such as, for example, an aluminum alloy, may comprise two or more sections that are releasably fastened to one another to permit access to the interior of housing 12 when necessary.

Adjustably mounted in the neck 14 of the housing is a direct current (D.C.) servomotor 16. Pins 17, which project from opposite sides, respectively, of the motor 16, extend slidably into opposed, axially-extending ways 18 that are formed on the inside of neck 14 to guide the motor 16 for limited adjustment axially of housing 12. Conventional means (not illustrated) may be employed for releasably securing the pins 17 in any desired adjusted position in the grooves 18.

Fastened to the outer end of the armature shaft 20 of motor 16 is an enlarged head 22, which is generally paraboloid in configuration. Fastened in spaced recesses formed in the outer, curved surface of the head 22 are a plurality of small permanent magnets 24, which are oriented in the same direction—for example, with their north poles facing outwardly.

Figure 2:
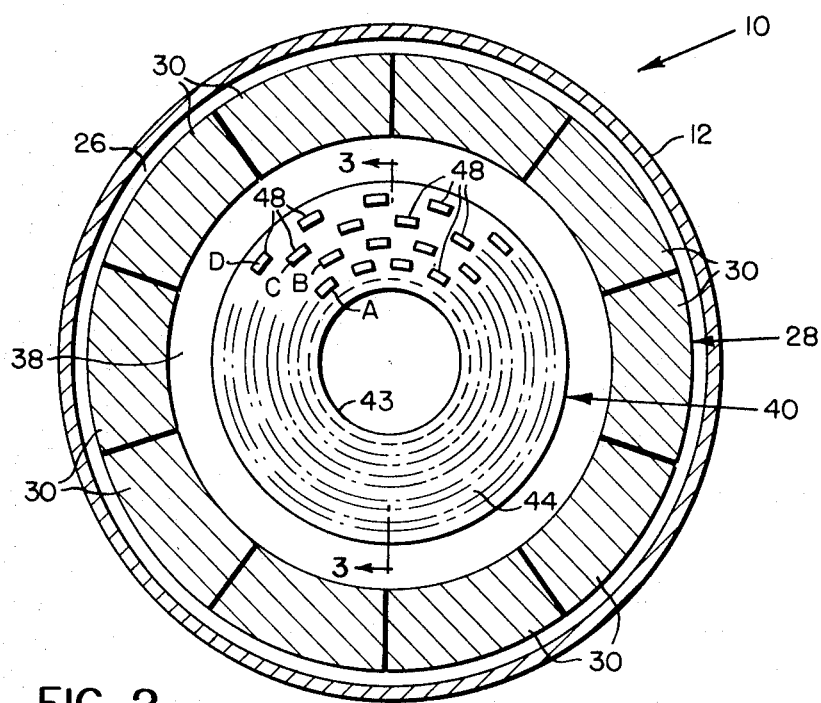
FIG. 2 is a sectional view of the this generator taken along the line 2–2 in FIG. 1 and looking in the direction of the arrows.

Secured in housing 12 inwardly of its neck 14 by a pair of resilient, annular rings or spacers 26, is a hollow, generally cylindrical, magnetic casing 28. Casing 28 comprises a plurality of identical, elongate permanent magnets 30, which, as illustrated more clearly in FIG. 2, are arcuate in cross section. At the upper end of the casing 28 (FIG. 1) the several magnets 30 curve inwardly toward the center of the casing and are shaped to form together a truncated-conical opening 32, which us surrounds the inner end of head 24 in radially spaced, coaxial relation thereto. At the opposite end of casing 28 magnets 30 curve inwardly toward the center of the casing and their ends lie in a common plane, annular surface 34, which extends normal to the axis of the casing and of shaft 20.

Mounted within the casing 28 coaxially thereof by a further pair of resilient, annular spacers 38 is a hollow cylindrical core 40. Core 40 comprises a spool 42 having a shank 43 and integral end flanges 44 and 45. Each of the spool flanges 44 and 45 has therein a plurality of arcuate openings 46 FIGS. 3 and 4), which are arranged in a plurality of concentric, radially spaced circular paths so that the openings in adjacent paths are angularly offset from one another about the spool axis.

Figure 3:
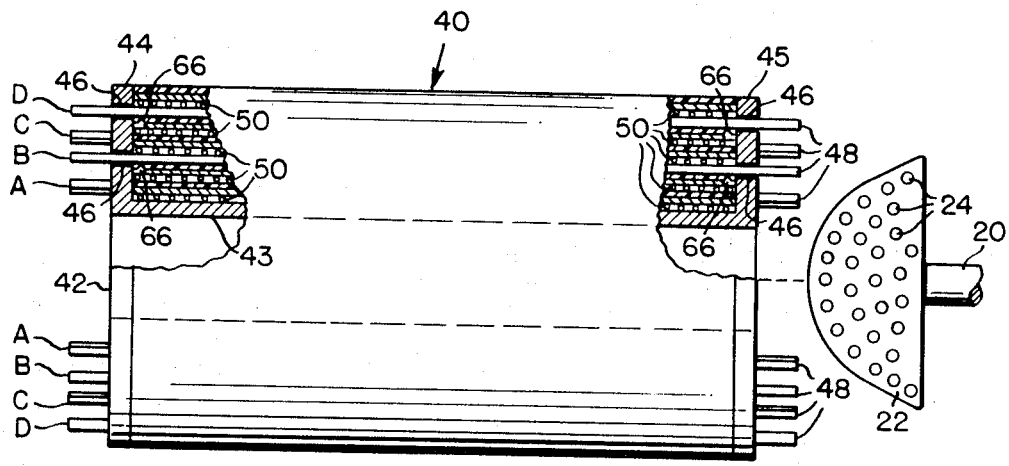
FIG. 3 is a fragmentary sectional view taken along the line 3–3 in FIG. 2 looking in the direction of the arrows.
Figure 4:
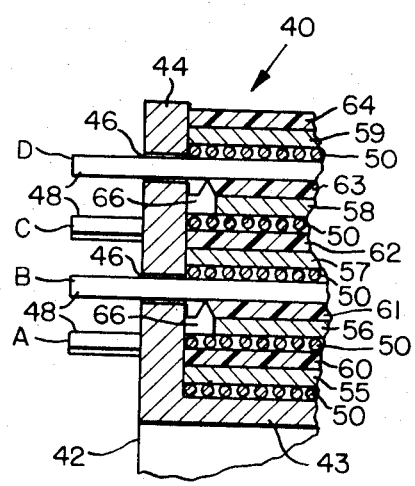
FIG. 4 is a fragmentary sectional view in the same plane as the view of FIG. 3 but on a greatly enlarged scale.

Mounted adjacent opposite ends thereof in registering openings 46 in the flanges 44 and 45 are a plurality of elongate, parallel, magnetizable metal strips or shims 48, opposite ends of which project for equal distances beyond opposite ends, respectively, of the spool 42. In the embodiment illustrated, four radially spaced rows of shims, designated at A, B, C and D, respectively, in FIGS. 2 to 4, are provided. The shims of group A, which is the radially innermost of the four groups, are radially spaced slightly from the outer peripheral surface of the shank of spool 42; and the shims 48 of one group are angularly offset about the axis of the spool relative to the shims in the next adjacent group.

Wound helically coaxially around the outside of the spool body between between the end flanges 44 and 45, is a magnetic wire coil 50 which is here shown as wound in five layers from a single, continuous insulated wire conductor, which, commencing, for example, with one end adjacent spool flange 44, is wound around the outer peripheral surface of the spool alternately to opposite spool flange 45, and then back again to flange 44. The successive layers of coil are enclosed in five layers 55, 56, 57, 58 and 59 of brass or aluminum foil; and these, in turn, are enclosed in five layers 60, 61, 62, 63 and 64 of relatively heavy gauge dielectric tape. This tape is the type which exhibits the characteristic of dipolar orientation in response to static induction, or when disposed in the presence of magnetic fields. One such dielectric material exhibiting this characteristic is an all purpose pressure-sensitive plastic tape sold under the tradename "Ger-pak." The innermost group A of the shims 48 are positioned around the outside of the dielectric layer 60 and the coil 50 is wound in a helical path around the outside of the shims 48 of group A, and the intervening portions of the dielectric layer 60, from spool flange 45 toward opposite spool flange 44. Coil 50 is then enclosed within the cylindrical layer 56 of foil; and the layer 61 of dielectric material is interposed between the foil layer 56 ad and the next group B of shims 48. The shims of group B are then enclosed in the coil 50, which is wound from adjacent spool flange 44, around the outside of the shims of group B, and the intervening portions of the dielectric layer 61, toward the opposite end flange 45.

In similar manner, the foil and dielectric layers 57 and 62, respectively, are interposed between the coil and the shims of group C; the shims of group C are enclosed within the coil, the foil layer 58 and the dielectric layer 63; and the shims of Group D are enclosed within the coil, the foil layer 59, and the outermost or final layer 64 of dielectric material.

As shown more clearly in FIGS. 3 and 4, each of the several openings 46 in the end flanges 44 and 45 has a cross-sectional area that is slightly larger than the cross-sectional area of the shim 48 extending therethrough. Projecting from the inside faces of the flanges 44 and 45 adjacent the radially innermost edges of the openings 46 therein are a plurality of spaced, stationary, fulcrums 66 (FIGS. 3 and 4). Each support 66 engages the radially inner side of a shim 48. This permits the ends of the shims 48 to vibrate radially of the core.

Figure 5:
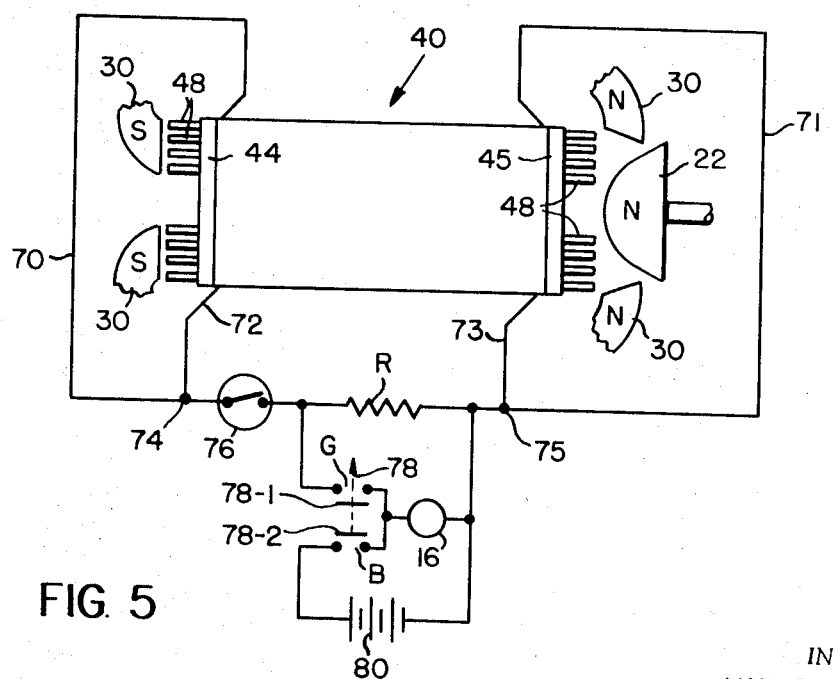
FIG. 5 is a schematic wiring diagram illustrating one manner in which the generator may be wired for operation, and illustrating portions of the generator fragmentarily.

Referring now to the schematic wiring diagram illustrated in FIG. 5, opposite ends of the conductor forming the coil 50 are represented by the leads 72 and 73. At one end of core member 40, for example at the end thereof adjacent the spool flange 44, all of the layers of foil 55 to 59 are connected to a common lead 70; and at the opposite end of member 40 the opposite ends of the foil layers 55 to 59 are connected to another common lead 71. The leads 70 and 72 are connected together at a common terminal 74, and the leads 71 and 73 are connected together in another common terminal 75. Connected in series between the terminals 74 and 75 is a conventional, controlled pulse width switch 76 and a resistance R. During the operation of the generator, switch 76 automatically opens and closes intermittently for a purpose to be described below.

The motor 16 is connected in circuit with a manually-operable, three-position switch 78 having a pair of switch contacts 78-1 and 78-2, which are in their open positions, when switch 78 is disposed in its OFF position as illustrated in FIG. 5. Switch 78 is movable manually from OFF position to a first position B, wherein its contact 78-2 connects motor 16 in series circuit with a battery 80. Switch 78 is also movable selectively to a second, or generator position G, in which switch contact 78-1 connects the motor 16 in parallel with the resistance R in the generator circuit.

As previously noted, the magnets 30 defining the casing 28 are oriented so that their north poles surround the ends of the shims 48 projecting from the spool flange 45, and their south poles surround the ends of the shims 48 projecting from the spool flange 44. The shims 48 are magnetized by induction, so that the ends thereof projecting from the flange 45 become the south poles of the shims, while the opposite ends of the shims become the north poles of the shims. Also as above noted, the magnets 24 in the head 22 on the motor shaft 20 are oriented so that their north poles face outwardly to confront the north poles on the magnets 30 and the south poles induced in the ends of the shims projecting from flange 45. The magnets in the head 22 thus tend to distort the magnetic field flux lines extending between the north poles of the magnets 30 and the adjacent ends of the shims 48.

To operate the generator, the switch 78 is first moved to its battery or B position to close the switch contact 78-2, and to energize the motor 16 from the battery 80. This rotates the motor shaft 20, and consequently the head 22 and its magnets 24. The rotating magnets 24 thus produce a dynamic rather than static distortion of the flux lines in the magnetic field extending between the magnets 30 and the adjacent ends of the shims 48; and consequently the ends of the shims projecting from the flange 45 begin to vibrate slightly. This vibration is transmitted through the shims 48 to the opposite ends thereof, so that the magnetic flux lines that extend between opposite ends of the shims also are constantly distorted or vibrated in planes extending transverse to, or radially of the five layers of coil 50. This causes a voltage to be induced in the coil 50, and a consequent electromagnetic field, which has flux lines extending transverse to the magnetic lines of flux that are induced in the shims 48. Electrostatic charges are thus built up on the surrounding foil condensers 55 to 59, and because of the strong magnetic field created by the magnets 30, the positive electrostatic charges on the condensers are attracted to the common condenser lead at one end of the member 40, for example to the lead 72, and the negative charges are attracted to the opposite ends of member 40, for example to the lead 73. This develops a voltage drop between the terminals 74 and 75.

Consequently, after the motor 16 has been started by the battery 80, the switch 78 can be moved to its generator or G position, to open the contact 78-2, and to close the contact 78-1, thereby connecting the motor 16 in parallel with the resistance R. The voltage appearing between the terminals 74 and 75 is then applied across the motor 16 each time the switch 76 closes. Switch 76 remains closed long enough to permit the charge that is built up by the condensers 55 to 59 to discharge through the motor 16; and then switch 76 automatically opens briefly once again to permit the voltage to build up between the terminals 74 and 75. The generator 10 may thus be used to supply power for operating the motor 16. When the generator is operating in this manner, a further load such as another electric motor, a heater, a lamp, or the like, may be connected in parallel with the resistor R for operation by the voltage developed between the terminals 74 and 75.

From the foregoing it will be apparent that once the motor 16 has been brought up to a predetermined desired speed by the battery 80, the switch 78 may be thrown to utilize the output of the generator 10 for driving the motor 16, as well as an additional load. Moreover, once the generator 10 has been placed in operation, it thereafter can be shut off and restarted without the use of the battery 80, provided that its operation is not interrupted for too long a period of time. For example, when the operation of the generator is interrupted by moving the switch 78 to its OFF position, in which both of the switch contacts 78-1 and 78-2 are open, conventional means can be provided for maintaining the switch 76 in its open position. Consequently as the motor 16 coasts to a stop, a charge will be built up and stored on the condensers 55 to 59, so that a potential will exist between the terminals 74 and 75 after the motor is stopped. Thereafter this potential can be used to restart the motor 16 when next the switch 78 is moved to its generator of G position.

While in the embodiment illustrated a single coil has been wound between each layer (A to D) of shims 48, it will be understood that two or more coils may be wound between each layer of shims if desired. Also, in the embodiment illustrated, the output of the generator 10 is a function of the speed at which the head 22 rotates and the distance the head is positioned axially from the adjacent end of the casing 28. Therefore, by adjusting the motor 16 axially in the guide slots 18 in the housing 12 the rate of change of flux caused by the distortion of the rotating head 22 can be altered. Moreover, if desired, the switch 76 may be a fast response, pulse width switch of the type utilizing modulated SCR's; and preferably the resistance of the load circuit is less than the resistance of the magnetic wire winding which serves as the flux collector in the core 40.

I claim:

1. An electrical generator comprising:
   a tubular core of nonmagnetic material;
   a group of elongate, magnetizable metal strips mounted on said core and extending in the direction of the axis of said core, and angularly spaced from one another about the axis of said core;
   a wire coil wound coaxially on said core intermediate the ends thereof;
   adjacent ends of said strips projecting beyond at least one end of said core;
   a permanent magnet positioned to have pole faces thereof disposed adjacent said one end of said core to magnetize said strips; and
   means for vibrating said strips so that the lines of flux in the magnetic field around said strips are distorted to induce a voltage in said coil;
   said means for vibrating said strips comprising:
   a member mounted to rote rotate adjacent said one end of said core coaxially thereof; and
   a plurality of spaced magnets mounted on said member for rotation therewith.

2. An electrical generator as defined in claim 1, including means mounting said member for axial adjustment toward and away from, selectively, said one end of said core.

3. An electrical generator as defined in claim 1, including:
   a layer of electrically conductive metal surrounding said core coaxially thereof; and
   a layer of dielectric material surrounding said layer of metal coaxially thereof;
   said metal strips being disposed between said layer of dielectric material and said coil.

4. An electrical generator as defined in claim 3, wherein:
   said coil has at least three radially spaced windings surrounding said core;
   there are two radially spaced groups of said metal strips surrounding said core, and separating said windings; and
   the strips of one of said groups are angularly offset about said axis relative to the strips of the other of said groups.

5. An electrical generator as defined in claim 4 including spaced support means engaged with each of said strips adjacent said one end of said core to support said projecting ends of said strips for vibration radially of said axis.

6. An electrical generator as defined in claim 3, including:
   means connecting opposite ends, respectively, of said layer of metal to a pair of output terminals:
   an electric motor for rotating said member; and means for selectively connecting said motor in circuit with said terminals and with a power supply independent of said generator.

7. An electrical generator comprising:
a tubular, nonmagnetic core;
a plurality of rows of angularly-spaced, electrically-conductive strips mounted in said core coaxially of said core and extending in the direction of the axis of said core;
each strip projecting at both ends beyond said core;
a wire coil wound helically about said rows of strips first in one direction, from adjacent one end of the core, and then in the other direction, to adjacent the other end of the core;
a thin layer of conductive material surrounding each row of strips;
a layer of dipolar dielectric material surrounding each layer of conductive material;
each pair of layers of conductive and dielectric material being interposed between successive windings of the coil;
a magnet surrounding said core, coil, and the layers of conductive and dielectric material;
said magnet comprising a plurality of identical, elongate permanent magnets having their opposite poles adjacent opposite ends, respectively of said strips; and
a head mounted rotatably adjacent one end of said strips within the adjacent pole faces of said elongate magnets; and
said head having a plurality of spaced magnets mounted therein and projecting therefrom toward the adjacent ends of said strips and oriented so that their ends of one polarity face the ends of the elongate permanent magnets which are of the same polarity.

8. An electric generator as claimed in claim 7, wherein the strips in each row are offset angularly about the axis of said core from the strips in the next adjacent row.

9. An electric generator as claimed in claim 7, having;
means connecting opposite ends, respectively, of said layers of conductive material to a pair of output terminals;
an electric motor for rotating said head; and
means selectively connecting said motor in circuit with said terminals or with a separate, independent power supply.